UNITED STATES PATENT OFFICE.

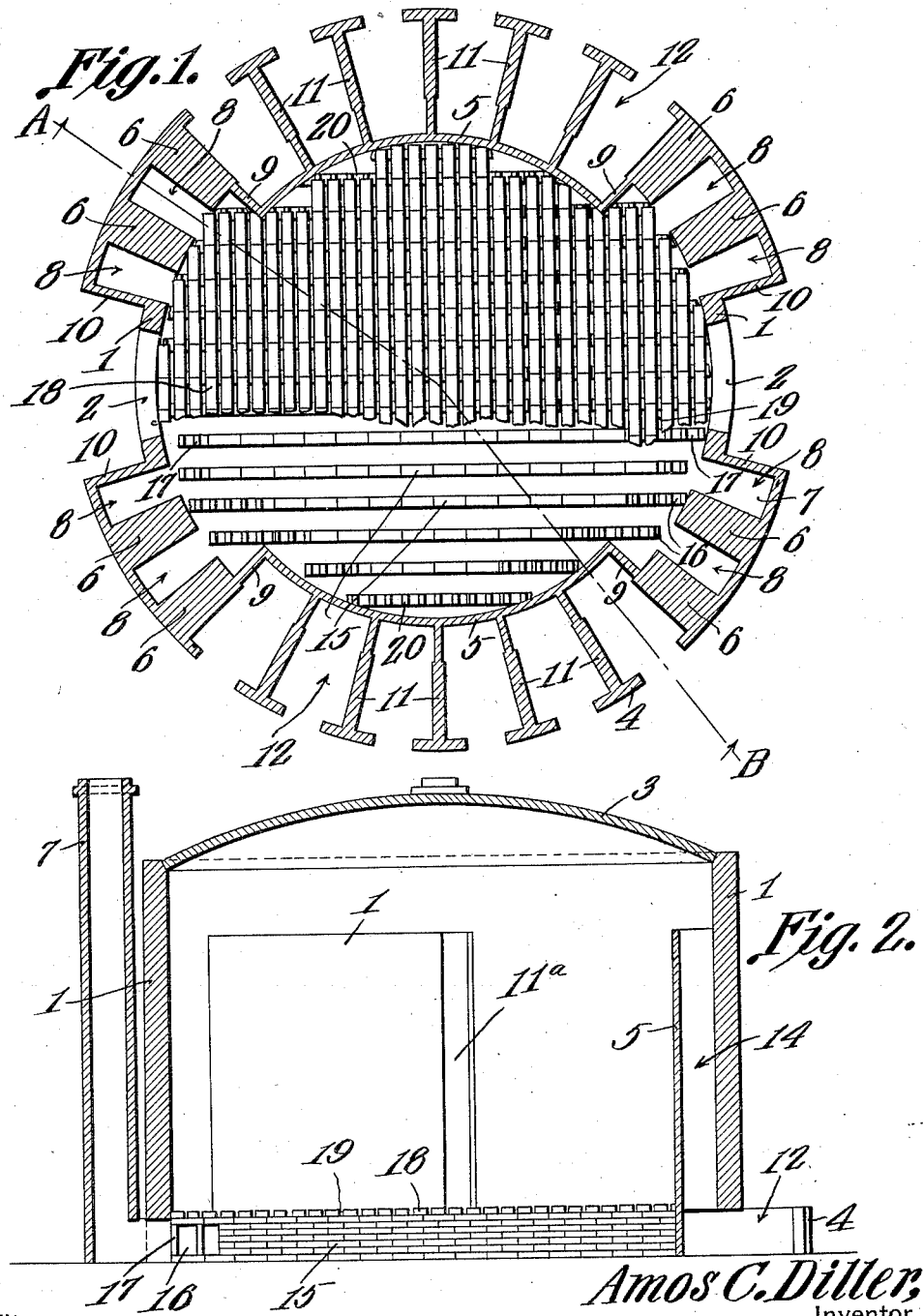

AMOS C. DILLER, OF NEAR BLUFFTON, OHIO.

KILN.

1,078,488.  Specification of Letters Patent. Patented Nov. 11, 1913.

Application filed November 20, 1911. Serial No. 661,377.

*To all whom it may concern:*

Be it known that I, AMOS C. DILLER, a citizen of the United States, residing at near Bluffton, but in the county of Putnam and State of Ohio, have invented a new and useful Kiln, of which the following is a specification.

The device forming the subject-matter of this application, is a kiln adapted primarily, although not exclusively, for the burning of fictile ware.

The invention aims to provide a kiln in which an even distribution of heat is effected, throughout all parts of the kiln, the construction being such that a maximum draft is produced, with a minimum height of stack.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in horizontal section, the cutting plane being passed along the door of the kiln; and Fig. 2 is a vertical transverse section, in which that portion of the kiln which lies above the floor, is cut upon the line A—B of Fig. 1, the chimneys at the right hand side of the figure being omitted.

The kiln herein disclosed, is shown as of circular configuration, although another outline may be determined upon, when desirable, without jeopardizing the utility of the invention.

The kiln comprises a main wall 1, having oppositely disposed openings 2, for the insertion of the ware into the kiln. The main wall 1 supports the top 3 of the kiln.

The main wall 1 is surrounded by an outer wall 4, of much less height than the main wall 1. Located within the main wall 1 is an inner wall 5 which is of much greater height than the outer wall 4, and of slightly less height than the main wall 1.

Projecting inwardly from the outer wall 4, upon both sides of the openings 2, are radial piers 6, supporting stacks 7, of which, in the present instance there are four. The flues 8 of the stacks 7 communicates with the spaces between the piers 6. The piers 6 which are most remote from the openings 2 are connected by radial walls 9, with the ends of the inner walls 5.

Radial walls 10, located upon both sides of the openings 2, connect the outer walls 4, at their ends, with the main wall 1. A series of radially disposed, inwardly projecting partitions 11 are provided. These partitions 11 extend beneath the main wall 1 and unite the outer walls 4 with the inner walls 5, these radial partitions 11 being carried upwardly, between the main wall 1 and the inner walls 5, as shown at 11ª, to define a series of bag flues 14, between the walls 1 and 5, the partitions 11 serving to define a series of furnaces 12, between the walls 1 and 4, the furnaces 12 communicating with the bag flues 14, as will be clearly understood from an inspection of Fig. 2.

Located within the kiln, at the bottom thereof, are a series of parallel division walls 15, the intermediate portions of these walls being fashioned from bricks laid closely together, so that the intermediate portions of the division walls 15 are imperforate, the ends of the division walls 15 having openings 16 therethrough, these openings 16 being fashioned by setting up certain of the bricks endwise, as shown at 17, adjacent the ends of the division walls 15. As shown at 20, the outermost division walls may consist entirely of bricks set up endwise, in spaced relation. From the foregoing it will be seen that the division walls 15 are perforated at their ends, adjacent the inner walls 5, and adjacent the piers 6. The division walls 15 support the floor of the kiln, which is a perforated structure. This perforated floor is preferably fashioned by supporting a series of bricks 18 terminally upon the division walls 15, as shown at 18, the bricks 18 being spaced apart, as shown at 19, to provide the perforations through the floor of the kiln. The bricks 18 preferably extend at right angles to the division walls 15.

In practical operation, when the fires are built in the furnaces 12, the products of combustion will be drawn inwardly, and will pass upwardly through the bag flues 14, the products of combustion passing thence downwardly through the ware in the kiln and through the spaces 19 between the bricks 18 which forms the floor of the kiln, the products of combustion passing thence between the division walls 15 and into the stacks 7.

Owing to the fact that the walls 15 are perforated at their ends, as shown at 16, owing to the spacing of the upright bricks 17 apart, the products of combustion will be drawn into the kiln evenly, about the entire inner circumference of the kiln, an even burning of the ware being thus effected. There is no opening in the top 3 of the kiln, and consequently the products of combustion will not be drawn together adjacent the center of the kiln. Therefore, an uneven burning of the ware will be avoided, the ware being burned hardest adjacent the center of the kiln, when there is a draft through the top of the kiln. As will be readily understood, the perforations 16 at the ends of the division walls 15 permit a free circulation of the products of combustion, about the periphery of the kiln, an even distribution of heat resulting. The floor 18 of the kiln is slightly above the fire surface of the furnaces 15, and thus excavation is avoided.

In a kiln constructed as above described, I have completed the process with nineteen hours burning in water-smoke, and twelve hours burning after the water-smoke had abated; whereas, in any other form of kiln which I had operated or seen, before the conception of the present invention, from forty to fifty hours were required for the burning off of the water-smoke, and from forty to sixty hours, after the water smoke was off. Moreover, in the kiln herein disclosed, I have burned a charge with eight tons of coal, as against from twenty to thirty tons, in kilns otherwise constructed.

Having thus described the invention, what is claimed is:—

A kiln comprising oppositely disposed sets of radial walls and a pier adjacent each end of both sets, the upper edges of the piers and walls lying in a common plane; a main wall supported by the piers and the radial walls, intermediate the inner and outer ends of the piers and radial walls; oppositely disposed inner walls extending unbrokenly between the inner ends of the piers, the radial walls having upwardly prolonged portions lying between the inner walls and the main wall and dividing the space between each inner wall and the main wall into a plurality of bag flues; and stacks supported by the piers, each inner wall constituting an unbroken baffle extending between the stacks.

In testimony that I claim the foregoing as my own, I have hereto affixed my signature in the presence of two witnesses.

AMOS C. DILLER.

Witnesses:
HENRY L. ROMEY,
W. B. MOORE.

Copies of this patent may be obtained for five cents each, by addressing the "Commissioner of Patents, Washington, D. C."